(12) United States Patent
Dubrovsky et al.

(10) Patent No.: US 12,463,974 B2
(45) Date of Patent: Nov. 4, 2025

(54) SECURING BLUEPRINTS FOR IMPLEMENTATION IN EDGE DEVICES

(71) Applicant: Dell Products L.P., Round Rock, TX (US)

(72) Inventors: Igor Dubrovsky, Beer Sheva (IL); Maxim Balin, Gan-Yavne (IL); Stav Sapir, Beer Sheva (IL)

(73) Assignee: Dell Products L.P., Round Rock, TX (US)

( * ) Notice: Subject to any disclaimer, the term of this patent is extended or adjusted under 35 U.S.C. 154(b) by 260 days.

(21) Appl. No.: 18/491,141

(22) Filed: Oct. 20, 2023

(65) Prior Publication Data

US 2025/0133086 A1    Apr. 24, 2025

(51) Int. Cl.
 *H04L 9/40* (2022.01)

(52) U.S. Cl.
 CPC ........ *H04L 63/102* (2013.01); *H04L 63/0428* (2013.01)

(58) Field of Classification Search
 CPC .......................... H04L 63/102; H04L 63/0428
 See application file for complete search history.

(56) References Cited

U.S. PATENT DOCUMENTS

| | | | | |
|---|---|---|---|---|
| 11,582,027 B1* | 2/2023 | Lawton | ................. | H04L 9/0891 |
| 11,816,465 B2* | 11/2023 | Koval | ....................... | G06F 8/71 |
| 11,895,192 B1* | 2/2024 | Mehta | .................... | H04L 67/565 |
| 2002/0144151 A1* | 10/2002 | Shell | ..................... | H04W 12/35 |
| | | | | 709/223 |
| 2005/0149626 A1* | 7/2005 | Manchester | ........ | H04W 12/033 |
| | | | | 709/220 |
| 2015/0365238 A1* | 12/2015 | Hui | ......................... | H04L 9/321 |
| | | | | 713/176 |
| 2020/0100108 A1* | 3/2020 | Everson | .............. | H04W 12/041 |
| 2020/0110638 A1* | 4/2020 | Asthana | .................. | H04L 67/51 |
| 2020/0160207 A1* | 5/2020 | Song | .................... | G06F 11/3466 |
| 2021/0144517 A1* | 5/2021 | Guim Bernat | ........ | G06F 9/5072 |
| 2021/0311787 A1* | 10/2021 | Popuri | ................... | G06F 9/5038 |
| 2022/0200787 A1* | 6/2022 | Kostman | ............... | H04L 9/3236 |
| 2022/0245281 A1* | 8/2022 | Fehling | .................... | H04L 67/12 |
| 2022/0269811 A1* | 8/2022 | Gummadivalli | .......... | G06F 9/54 |
| 2023/0300622 A1* | 9/2023 | Yan | ........................ | H04W 12/71 |
| | | | | 713/155 |
| 2023/0325267 A1* | 10/2023 | Wang | ......................... | G06F 8/61 |
| 2024/0020388 A1* | 1/2024 | Goodman | ............. | G06F 21/575 |
| 2024/0022609 A1* | 1/2024 | Smith | ..................... | G06F 9/5088 |
| 2024/0045764 A1* | 2/2024 | Wilding | ................... | G06F 9/541 |
| 2024/0086223 A1* | 3/2024 | Georgiev | ............. | G06F 9/45558 |
| 2024/0152600 A1* | 5/2024 | Goennheimer | ....... | G06F 9/5072 |
| 2024/0184260 A1* | 6/2024 | Marrone | ............. | G05B 19/042 |

(Continued)

*Primary Examiner* — Harris C Wang
(74) *Attorney, Agent, or Firm* — WOMBLE BOND DICKINSON (US) LLP

(57) ABSTRACT

Methods and systems for securing blueprints are disclosed. A blueprint may be secured by requiring sufficient privilege to implement the blueprint. The sufficient privilege may be obtained through an analysis of permissions of a blueprint user and the blueprint authors. An analysis of the permissions of the blueprint user and the blueprint authors may include reviewing privileges of the blueprint user and the blueprint authors. When the sufficient privilege may be found for the blueprint user and the blueprint authors, use of the blueprint may be permitted on an edge device.

20 Claims, 6 Drawing Sheets

(56) References Cited

U.S. PATENT DOCUMENTS

| | | | |
|---|---|---|---|
| 2024/0259768 A1* | 8/2024 | Zhang | H04W 4/06 |
| 2024/0372871 A1* | 11/2024 | Zaman | H04L 63/20 |
| 2025/0053532 A1* | 2/2025 | Mackenbach | G06K 19/07749 |
| 2025/0055854 A1* | 2/2025 | Surcouf | H04L 63/20 |
| 2025/0055881 A1* | 2/2025 | Kedia | H04L 63/20 |
| 2025/0094591 A1* | 3/2025 | Balin | G06F 21/57 |

* cited by examiner

SECURING BLUEPRINTS FOR IMPLEMENTATION IN EDGE DEVICES

FIELD

Embodiments disclosed herein relate generally to securing blueprints. More particularly, embodiments disclosed herein relate to securing creation, modification, and implementation of blueprints.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
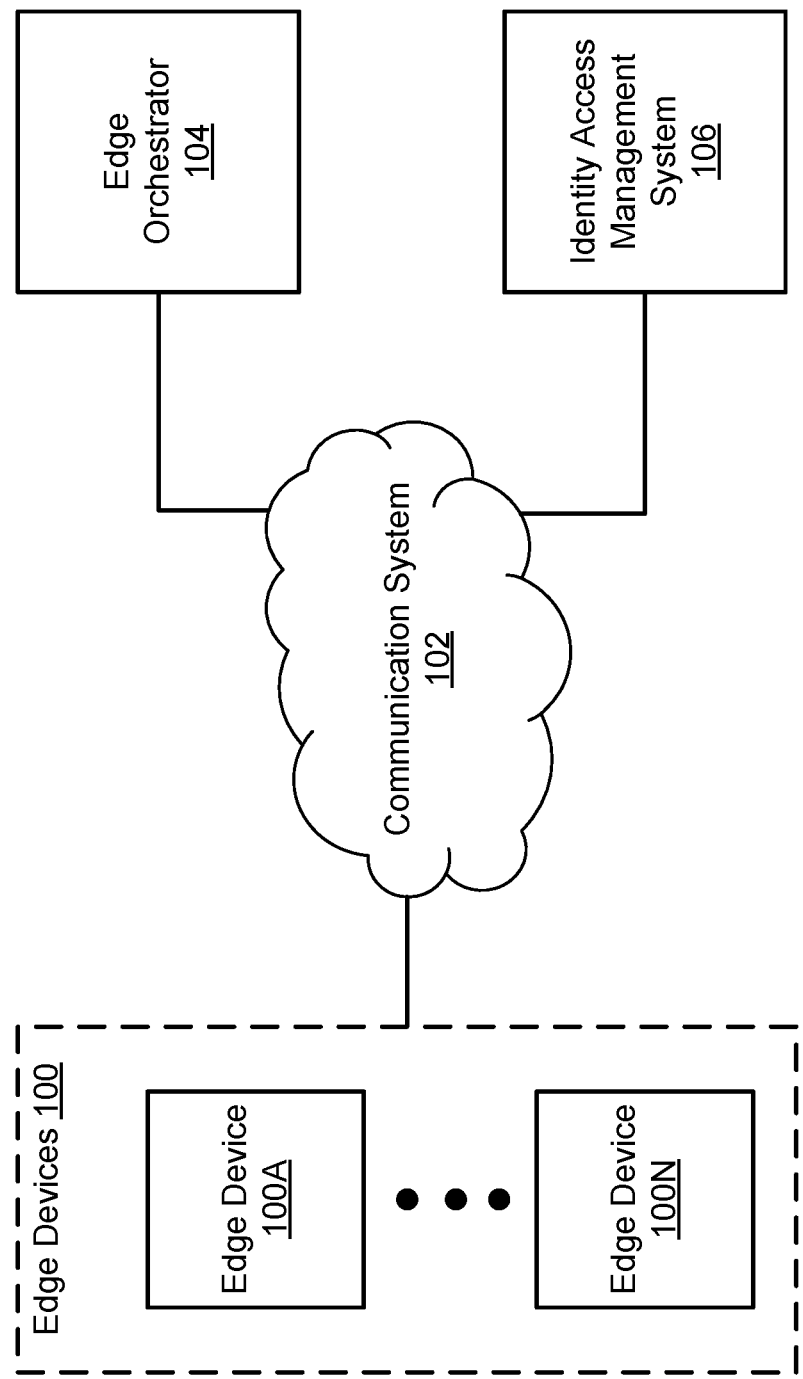
FIG. 1 shows a diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for securing blueprints. A blueprint may be secured by enforcing privilege checking for implementation. The blueprint may be used through requests made by blueprint users. An edge orchestrator may need to check if the blueprint user has sufficient privilege to use the blueprint in an edge device.

The edge orchestrator may check for sufficient privilege of the blueprint user to use the blueprint by extracting permissions from the blueprint user profile. The permissions may be assessed to understand what privileges the blueprint user has. If the edge orchestrator determines that the blueprint user has the sufficient privilege among the privileges, then the next step may be to check for sufficient privilege of the blueprint authors.

To check for sufficient privilege of the privileges of the blueprint authors, permissions of the authors may be extracted from the authors user profiles. The permissions may be assessed to understand what privileges the blueprint authors have. If the edge orchestrator determines that the blueprint authors have the sufficient privilege among the privileges, then edge orchestrator may permit use of the blueprint on one or more edge devices.

In an embodiment, a method for securing a blueprint is provided. The method may include (i) obtaining, from a blueprint user, a request for an edge device of an edge deployment to use a blueprint to update operation of the edge device; (ii) making a first determination regarding whether the blueprint user is privileged to make the request for the edge device to use the blueprint to update the operation of the edge device; (iii) in a first instance of the first determination where the blueprint user is privileged to make the request: (a) making a second determination regarding whether a blueprint author of the blueprint is privileged to author the blueprint; (b) in a first instance of the second determination where the blueprint author of the blueprint privileged to author blueprint: (1) creating a signed work order to implement the blueprint by the edge device; and (2) providing the signed work order to the edge device to initiate use of the blueprint by the edge device.

The first determination is made at least in part using an identity and access management system that maintains roles for persons with respect the deployment, the roles comprising blueprint users and blueprint authors, the blueprint users having first privileges, and the blueprint authors having second privileges.

The method may further include, in a second instance of the first determination where the blueprint user is not privileged to make the request: denying the request of the blueprint user to use the blueprint to update operation of the edge device.

The method may further comprise, in a second instance of the second determination where the blueprint author of the blueprint is not privileged to author the blueprint: denying the request of the blueprint user to use the blueprint to update operation of the edge device.

A blueprint includes a set of actions that can be performed by an edge device of the edge deployment.

Performing an action comprises installation of new software or changing or more features of software on the edge device of the edge deployment.

The first privileges includes at least the right to implement a blueprint in an edge device of the edge deployment and the second privileges comprise at least the right to implement, create, and modify the blueprint in the edge device of the edge deployment.

A work order includes instructions for at least how to implement the blueprint on an edge device of the edge deployment.

The work order is signed with the private key of the blueprint user who obtains a request to use the blueprint to update operation of the edge device of the edge deployment.

The work order implements a request to use a blueprint that is signed with private keys of one or more authors who created and modified the blueprint.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a system in accordance with an embodiment is shown. The system may provide any number and types of computer implemented services (e.g., to user of the system and/or devices operably connected to the system). The computer implemented services may include, for example, data storage service, instant messaging services, etc.

To provide computer implemented services, various devices may need to be operating in predetermined manners. For example, to provide instant messaging services, a computing device may need to be configured in a predetermined manner, may need to host certain software, and/or may otherwise need to operate in a specific manner.

If the computing device does not operate in the specific manner, then the computer implemented services may not be provided and/or may be provided but in an undesirable manner.

For example, returning to the discussion of instant messaging services, the configuration of the data processing system may include applying settings to communication components of the computing device. If the settings are not applied, then communications by the computing device may be compromised by other devices. If compromised, the data carried by the instant messages may also be compromised.

In general, embodiments disclosed here relate to systems and methods for managing the operation of computing devices. To manage the operation of the data processing systems, blueprints may be used. A blueprint may be a data structure that may be used to place a computing device into a desired operating state (e.g., conducive to providing corresponding computer implemented services). For example, a blueprint may define configuration settings, software to be hosted, actions to be performed, and/or other information usable by an automation framework hosted by a computing device to update operation of the computing device.

However, the blueprints are only as useful as they are trusted. A malicious blueprint may place a computing device in an undesired operating state.

To reduce the likelihood of blueprints placing computing devices in undesired operating state, embodiments disclosed herein may also facilitate securing of blueprints. The blueprints may be secured with an identity access management (IAM) system. The IAM system may define the privileges afforded to different users with respect to creation and use of blueprints.

For example, blueprints may be secured by verifying a level of privilege for blueprint authors and blueprint users. By verifying a level of privilege, operations by an edge device may be secured.

Figure 2A:
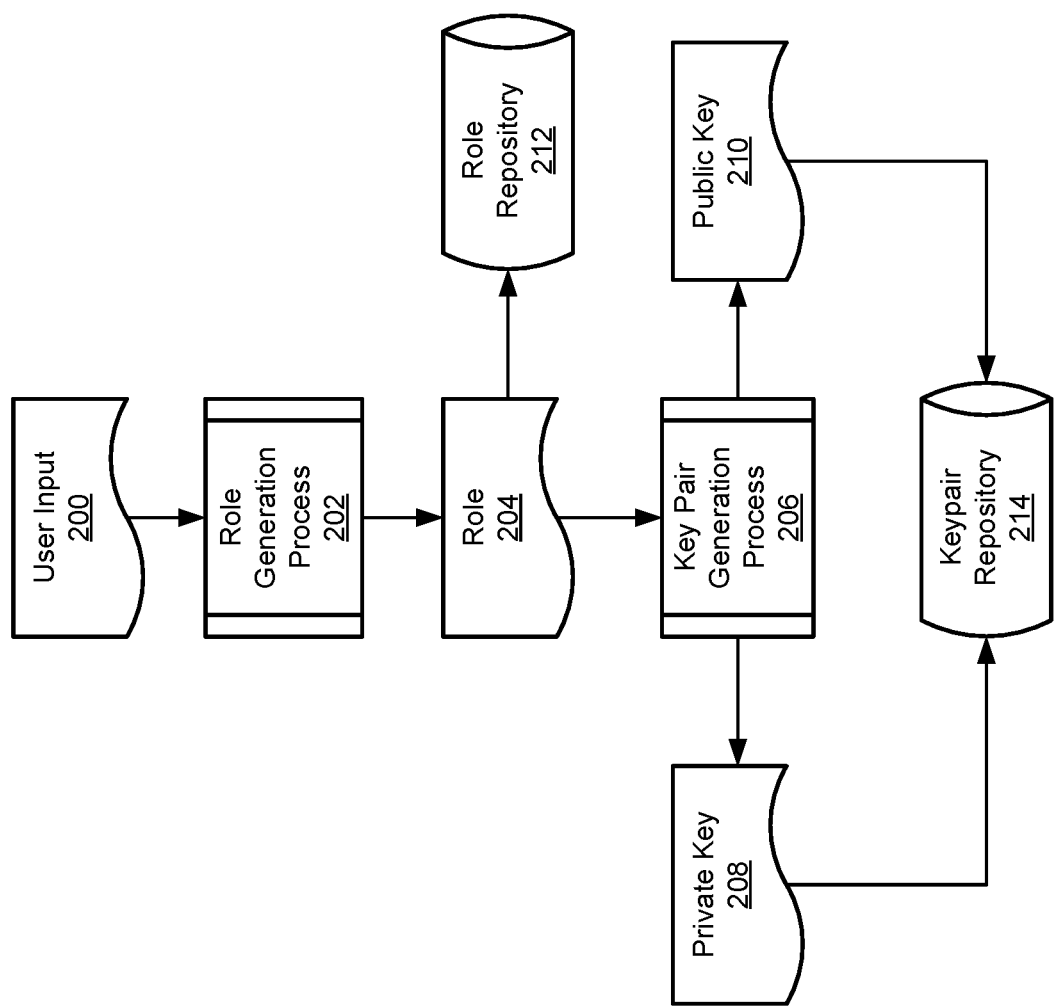
FIG. 2A-2C shows data flow diagrams illustrating operation of a system in accordance with an embodiment.

Blueprint authors and blueprint users may have a role categorization in that IAM that implies a level of privilege for creation and use of blueprints. The level of privilege may entitle the blueprint authors and the blueprint users the privilege of creation, modification, and/or use of blueprints in updating operation of computing devices. Along with the role categorization, the blueprint authors and the blueprint users may be assigned public/private key pairs. The public/private key pairs may be used in signing and validation of signatures on creation, modification, and/or use of blueprints. Refer to FIG. 2A for additional details regarding keys, roles, privileges, and/or other aspects of the IAM system.

Figure 2B:
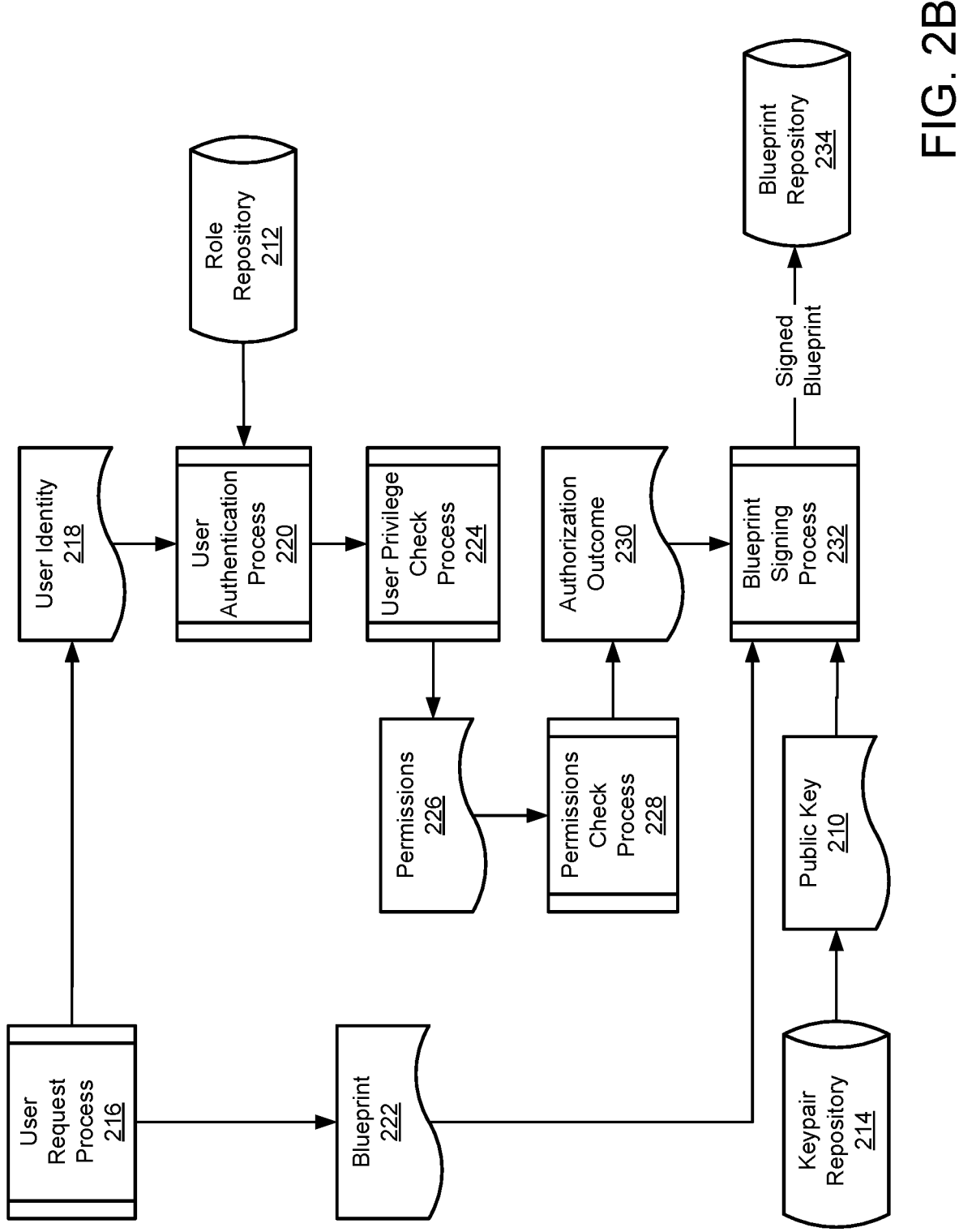

On creation and/or modification of a blueprint, the permissions of the blueprint author using the blueprint may need to be accessed on an edge orchestrator. On accessing the permissions of the blueprint author or the blueprint user, the permissions may be checked for sufficient privilege for creation and/or modification of the blueprint. If sufficient privilege is found in the permissions of the blueprint author or the blueprint user, then the blueprint may be signed using a public key and stored in a blueprint repository for use. Refer to FIG. 2B for additional details regarding modification of blueprints.

On implementation (e.g., when a blueprint is selected for and used in updating of operation of a computing device) of a blueprint by a blueprint user, permissions of the blueprint user may be accessed by an edge orchestrator prior to allow the blueprint to be used. On accessing the permissions of the blueprint user, the permissions may be checked for sufficient privilege to use the blueprint to update operation of a computing device. If the sufficient privilege of the blueprint user is not found, then the edge orchestrator may deny use of the blueprint by the blueprint user. Otherwise, if the sufficient privilege of the blueprint user is found, then permissions of an author of the blueprint may be checked.

Figure 2C:
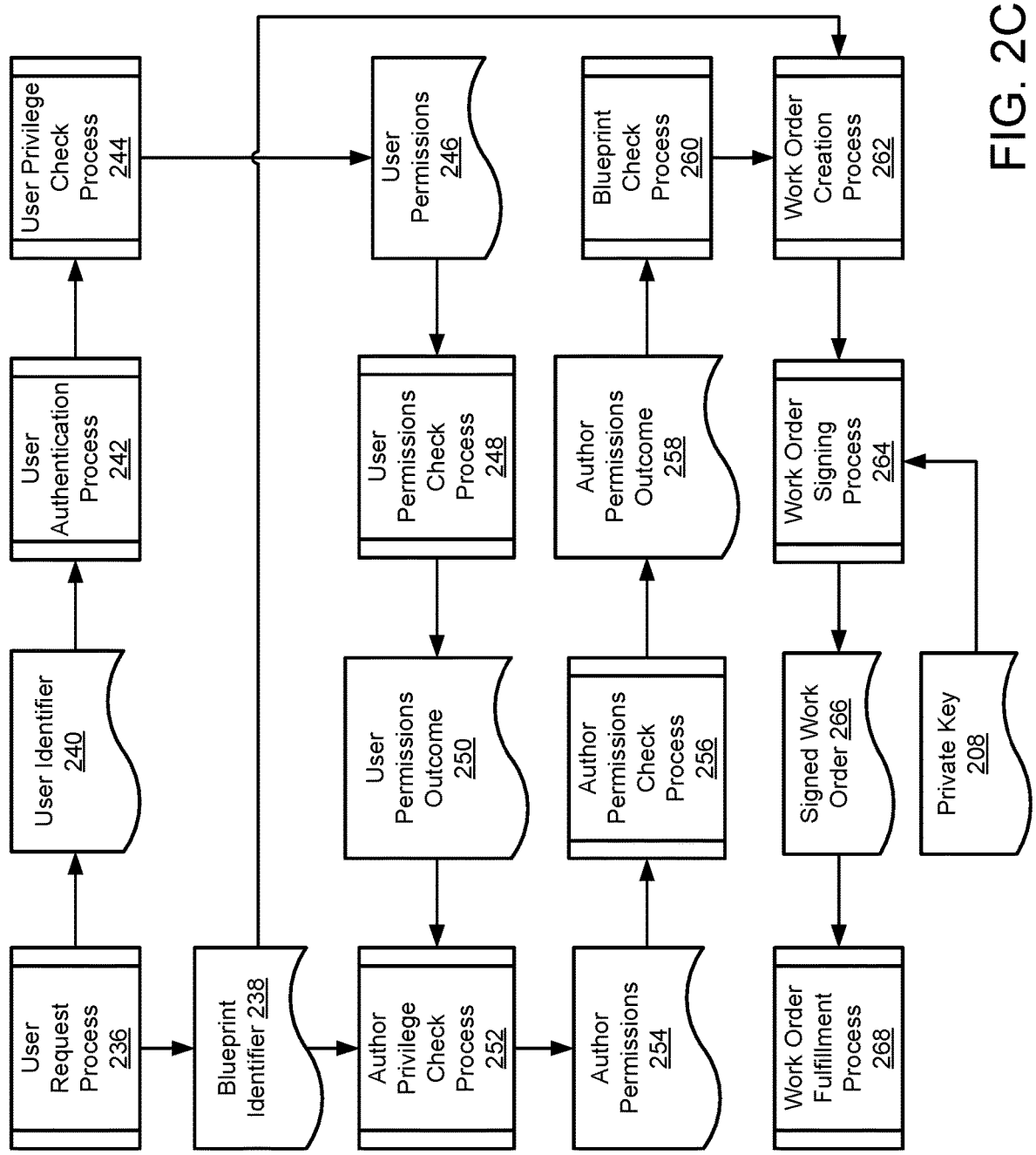

To check the permissions of the author, the permissions may be reviewed for sufficient privilege to create the blueprint. If the sufficient privilege of the author to create the blueprint is not found, then the edge orchestrator may deny use of the blueprint by the blueprint user. Otherwise, if the sufficient privilege of the blueprint user is found, then the blueprint may be used to update operation of one or more of edge devices 100. Refer to FIG. 2C for additional details regarding use of blueprints to update the operation of edge devices.

By doing so, embodiments disclosed herein may reduce the likelihood that blueprints compromise the operation of endpoint devices may restricting which users are authorized to create, modify, and use blueprints.

To provide the above noted functionality, the system may include edge devices 100, edge orchestrator 104, and identity access management 106. Each of these components is discussed below.

Edge devices 100 may include any number of edge device 100A-100N. Edge device 100A-100N may provide any number and type of computer implemented services. To do so, edge devices 100A-100N may utilize blueprints to update their operation. Prior to allowing any blueprints to be used to update its operation, Edge device 100A-100N verify authority of users of the blueprint to use them, and that the blueprints were created by authors that have sufficient privilege to create the blueprints.

Edge orchestrator 104 may secure blueprints and initiate use of blueprints to update operation of edge devices 100. To secure blueprints, edge orchestrator 104 may maintain a repository of blueprints that are trusted. The privilege of authors of the blueprints may be verified prior to addition of blueprints to the repository.

Additionally, when a request to update operation of an endpoint device using a blueprint is obtained, edge orchestrator 104 may verify the authority of the requestor to use the blueprint and the authority of the author of the blueprint to create/modify the blueprint.

Identity access management system 106 may manage permissions with respect to blueprints. For example, IAM system 106 may maintain a repository of permissions (e.g., defined by administrators) and provide information regarding the privilege of different users with respect to blueprints.

Figure 3:
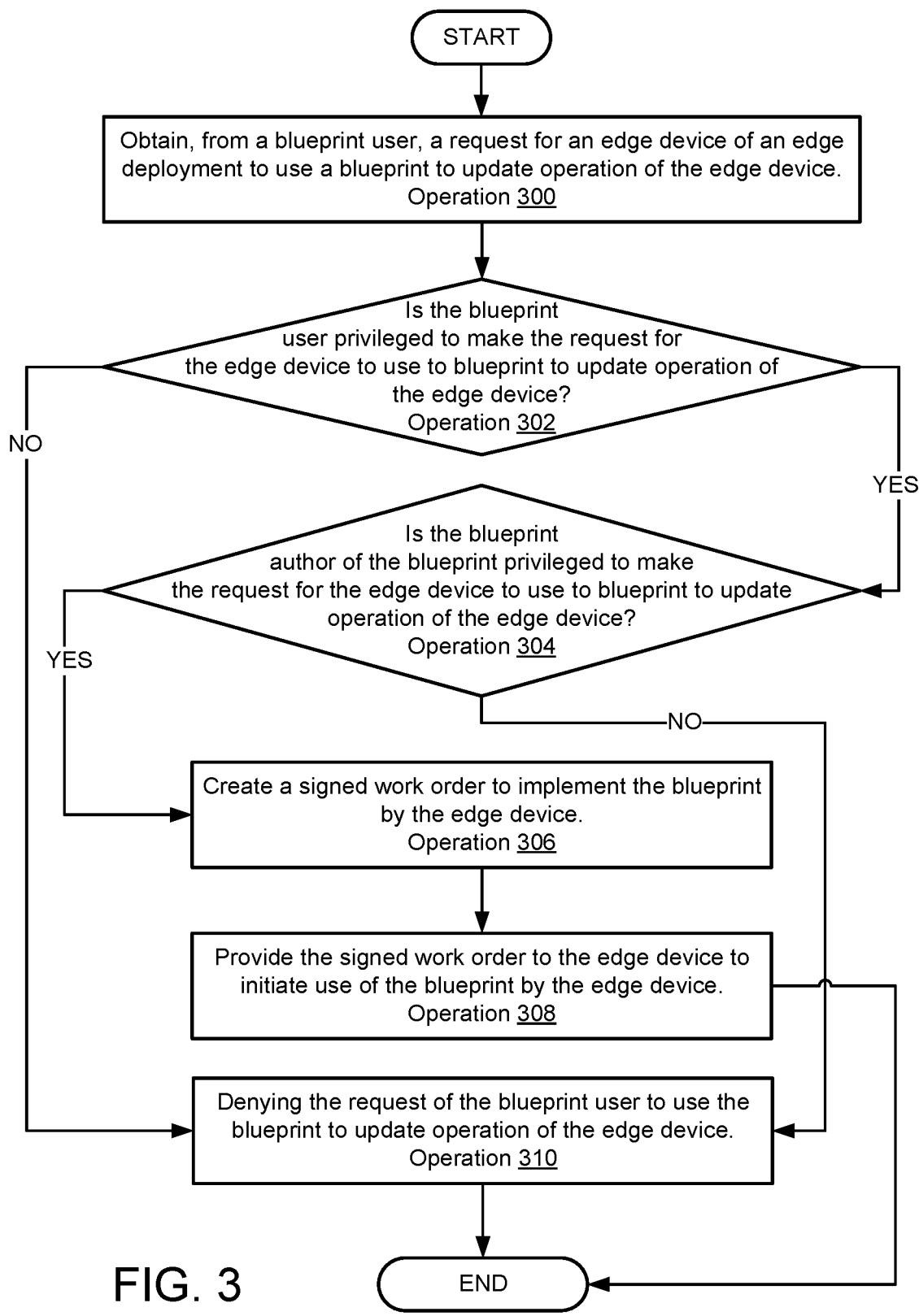
FIG. 3 shows a flow diagram illustrating a method in accordance with an embodiment.

When providing their functionality, any of (and/or components thereof) edge devices 100, edge orchestrator 104, and identity access management system 106 may perform all, or a portion, of the actions and methods illustrated in FIGS. 2A-3.

Any of (and/or components thereof) edge devices 100, edge orchestrator 104, and identity access management system 106 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

While illustrated in FIG. 1 as including a limited number of specific components, a system in accordance with an embodiment may include fewer, additional, and/or different components than those components illustrated therein.

Thus, as shown in FIG. 1, a system in accordance with an embodiment may secure edge devices by establishing sufficient privilege of a blueprint user that requests use of a blueprint and an author who created and/or modified the blueprint.

To further clarify embodiments disclosed herein, data flow diagrams in accordance with an embodiment are shown in FIGS. 2A-2C. In these diagrams, flows of data and processing of data are illustrated using different sets of shapes. A first set of shapes (e.g., 200, 204, etc.) is used to represent data structures, a second set of shapes (e.g., 202, 206, etc.) is used to represent processes performed using and/or that generate data, and a third set of shapes (e.g., 218, 230, etc.) is used to represent large scale data structures such as databases.

Turning to FIG. 2A, a first data flow diagram in accordance with an embodiment is shown. The first data flow diagram may illustrate data used in and processes performed in role generation for a user (e.g., a blueprint user and/or blueprint author).

The role generation may begin with user input 200, which may include parameters that describe a blueprint user and gives access to edge devices 100 and edge orchestrator 104. The parameters may include, for example, a username with a password and/or pin number, and information describing the level of privilege.

All parameters and information in user input 200 may be ingested by role generation process 202. During role generation process 202, creation of a blueprint user profile and/or privilege criteria may occur, which may be described by a set of permissions for access on edge devices 100. The blueprint user profile and/or privilege criteria may be used to describe role 204. Role 204 may then be stored in role repository 212.

During key pair generation process 202, production of private key 208 and public key 210 may follow creation of role 204. Public key 210 and private key 208 may be stored in keypair repository 214, and private key 208 may be encrypted with requiring password input requirement.

Thus, using the interaction diagram shown in FIG. 2A, embodiments disclosed herein may illustrate data used in and processes performed in role generation for a user (e.g., a blueprint user and/or blueprint author).

Turning to FIG. 2B, a second data flow diagram in accordance with an embodiment is shown. The second data flow diagram may illustrate data use in and processes performed in validation of a blueprint.

To initiate validation of a blueprint, the process to push blueprint 222 to blueprint repository 234 may be initiated by user request process 216. Blueprint 222 may be the blueprint that has been created or modified by an author and may be pushed to a blueprint repository 234. The process to push blueprint 222 to blueprint repository 234 may begin with user identity 218 undergoing user authentication process 220.

During user authentication process 220, identification of user identity 218, that is currently pushing blueprint 222 to blueprint repository 234, may occur. Identification of user identity 218 may include finding user identification information among all registered users and the permissions of the author. Information about user identity 218 may be found by querying role repository 218, where all blueprint user information may be stored.

Once the user has been authenticated, user privilege check process 224 may begin. During user privilege check process 224, all permissions from a user profile of user identity 218 may include queried and isolated. A set of permissions found from querying and isolating the permission from the user profile of user identity 218 may be organized to obtain permissions 226. Permissions 226 may be ingested in permissions check process 228.

During permissions check process 228, itemization of modifications may take place that have occurred on blueprint 222 by the author. For each modification, permissions check process 228 may involve querying if the modification on blueprint 222 was permitted by the author that made the modification. Results of each query may be organized and presented in authorization outcome 230.

Authorization outcome 230 may summarize the actions and/or the modifications to blueprint 222. Along with the summary, authorization outcome 230 may determine if the modifications in blueprint 222 can be accepted. If the modifications in blueprint 222 cannot be accepted, then authorization outcome 230 may deny the push to blueprint repository 234.

If the modifications in blueprint 222 can be accepted, then authorization outcome 230 may permit blueprint signing process 232 to be performed. During blueprint signing process 232, modifications may be saved in blueprint 222. Along with saving the modifications, the set of modifications may be encrypted on blueprint 222 with public key 210.

After encryption of blueprint 222 with public key 210 from keypair repository 214, blueprint 222 may be stored to blueprint repository 234. Blueprint repository 234 may include some or all blueprints for use by edge devices 100. An author may access blueprint repository 234 to make modifications and then certify the modifications in a process described here in FIG. 2B.

Thus, using the interaction diagram shown in FIG. 2B, embodiments disclosed herein may illustrate validation of a blueprint.

Turning to FIG. 2C, a third data flow diagram in accordance with an embodiment is shown. The third data flow diagram may illustrate data used in and processes performed to use a blueprint to update operation of a data processing system.

During user request process 236, a request to use a blueprint on one or more edge devices may be made. Use of the blueprint may include the execution of instructions on the blueprint. The blueprint may have been created and further modified by one or more authors and may be used by a blueprint user or a blueprint author.

To use the blueprint, during user authentication process 242, the identity of the blueprint user may be verified that has initiated user request process 236. Verifying the identity of the blueprint user may entail searching a repository of users, similar to role repository 218 in FIG. 2B, to find user identifier 240 associated with the blueprint user. Once the blueprint use has been identified during user authentication process 242, user privilege check process 244 may proceed.

During user privilege check process 244, extraction of user permissions 246 from the user profile or user identity information may occur. User permissions 246 may include (i) what type of role the user has (i.e. author and/or administrator, etc.) (ii) what types or classes of blueprints the user may use, and/or (iii) on what edge devices the blueprint user may use blueprints.

User permissions outcome 250 may summarize the search results of user permissions check process 248. The format of user permissions outcome 250 may be a human-readable format in which user permissions 246 may be understood clearly to any user or author of edge devices 100. Further, user permissions outcome 250 may list whether the user is permitted to use the blueprint. If the blueprint user is not permitted to use the blueprint, then use of the blueprint may be denied. Otherwise, if the blueprint user is permitted to use the blueprint, then the flow of data in FIG. 2C may continue with author privilege check process 252.

During author privilege check process 252 extraction of author permissions 254 from the author profile or author identity information may occur. Author permissions 254 may include (i) what types or classes of blueprints the authors may create and/or modify, and/or (ii) what types of changes to processes the authors can make in a blueprint.

Author permissions outcome 258 may summarize the search results of author permissions check process 256. The format of author permissions outcome 258 may be a human-readable format in which author permissions 254 may be understood clearly to any blueprint user or blueprint author of edge devices 100. Further, Author permissions outcome 258 may list whether the authors are permitted to make changes and which changes are permissible that the author made.

If the authors are not permitted to create and/or modify the blueprint, then use of the blueprint may be denied. Otherwise, if the authors are permitted to create and/or modify the blueprint, then the flow of data in FIG. 2C may continue with blueprint check process 260.

During blueprint check process 260, a check of the integrity of the blueprint may occur. The integrity of the blueprint may be (i) checking the blueprint for errors, (ii) checking to which edge devices of edge devices 100 the blueprint may be applicable, and/or (iii) simulating use of the blueprint to foresee results of use before using on one or more of edge devices 100. Blueprint check process 260 may be necessary to foresee and mitigate errors in using the blueprint on one or more of edge devices 100. Should any errors be found in the checking and simulation of the blueprint, the blueprint user of user request process 236 may be prompted for further testing and remediation of the blueprint. Otherwise, should no errors be found in the checking and simulation of the blueprint, then the flow of data in FIG. 2C may continue with work order creation process 262.

During work order creation process 262, assignment of the blueprint by an identifier, blueprint identifier 238, for use on one or more edge devices 100 may occur. Work order creation process 262 may set for immediate or delayed use of the blueprint. Work order creation process 262 may include using the blueprint only one time or multiple times at a user-defined frequency. Once work order creation process 262 creates a work order for implementation of the blueprint, work order signing process 264 may be performed.

During work order signing process 264, signing of the work order for use of the blueprint with private key 208 may occur. Private key 208 may be from a public/private key pair of the blueprint user from user request process 236. Work order signing process 264 may certify that the user request process 236 was initiated for use of the blueprint, the blueprint user and the blueprint authors of blueprint 236 were verified, and a work order for use of the blueprint was created. Completion of work order signing process 264 may yield signed work order 266.

Signed work order 266 may be submitted to one or more edge devices on which work order fulfillment process 260 may be processed. During work order fulfillment process 260, use of the blueprint may be directed, using instructions from the work order.

Thus, using the interaction diagram shown in FIG. 2C, embodiments disclosed herein may illustrate use of a blueprint.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIG. 1 may perform various methods to secure blueprints. FIG. 3 illustrates a method that may be performed by the components of the system of FIG. 1. In the diagram discussed below and shown in FIG. 3, any of the operations may be repeated, performed in different orders, and/or performed in parallel with or in a partially overlapping in time manner with other operations.

Turning to FIG. 3, a first flow diagram illustrating a method of securing a blueprint in accordance with an embodiment is shown. The method may be performed, for example, by any of the components of the system of FIG. 1, and/or other components not shown therein.

At operation 300, a request for an edge device of an edge deployment may be obtained, from a blueprint user, to use a blueprint to update operation of the edge device. The request may be obtained by receiving a request from a blueprint user to use the blueprint.

At operation 302, a determination may be made regarding whether the blueprint user is privileged to make the request for the edge device to use the blueprint to update operation of the edge device. The determination may be made by extracting the permissions from the profile of the blueprint user and assessing the privileges from the permissions of the blueprint user.

If the blueprint user is privileged to make the request, then the method may continue at operation 304. Otherwise, the blueprint user is not privileged to make the request, then the method may continue at operation 310.

At operation 302, a determination may be made regarding whether the blueprint author is privileged to make the request for the edge device to use the blueprint to update operation of the edge device. The determination may be made by extracting the permissions from the profile of the blueprint author and assessing the privileges from the permissions of the blueprint author.

If the blueprint author is privileged to make the request, then the method may continue at operation 306. Otherwise, the blueprint user is not privileged to make the request, then the method may continue at operation 310.

At operation 306, a signed work order may be created to implement the blueprint by the edge device. The signed work order may be created by constructing a set of instructions that guide implementation of the blueprint the edge device.

At operation 308, the signed work order may be provided to the edge device to initiate use of the blueprint by the edge device. The signed work order may be provided by sending the signed work order to the edge device along with the blueprint of a blueprint identifier by which to identify and obtain the blueprint.

The method may end following operation 308.

Returning to operation 302, at operation 310, the request of the blueprint user to use the blueprint to update operation of the edge device may be denied. The request may be denied by prohibiting use of the blueprint to update operation of the edge device.

The method may end following operation 310.

Returning to operation 304, at operation 310, the request of the blueprint user to use the blueprint to update operation of the edge device may be denied. The request may be denied by prohibiting use of the blueprint to update operation of the edge device.

The method may end following operation 310.

Figure 4:
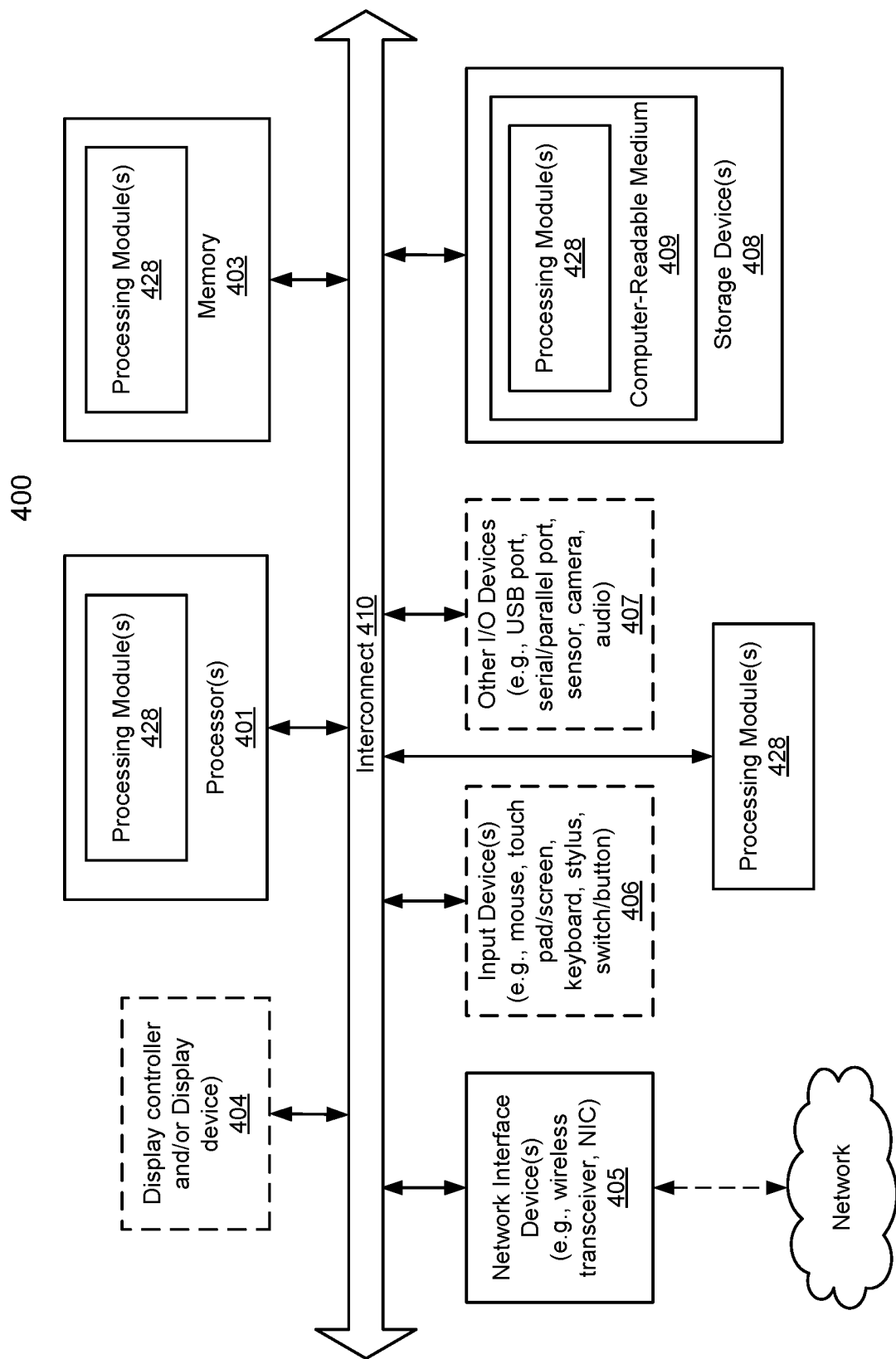
FIG. 4 shows a block diagram illustrating a data processing system in accordance with an embodiment.

Any of the components illustrated in FIGS. 1-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor

401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for securing a blueprint, the method comprising:
    obtaining, from a blueprint user, a request for an edge device of an edge deployment to use a blueprint to update operation of the edge device;
    making a first determination regarding whether the blueprint user is privileged to make the request for the edge device to use the blueprint to update the operation of the edge device;
    in a first instance of the first determination where the blueprint user is privileged to make the request:
        making a second determination regarding whether a blueprint author of the blueprint is privileged to author the blueprint;
        in a first instance of the second determination where the blueprint author of the blueprint privileged to author blueprint:
            creating a signed work order to implement the blueprint by the edge device; and
            providing the signed work order to the edge device to initiate use of the blueprint by the edge device.

2. The method of claim 1, wherein the first determination is made at least in part using an identity and access management system that maintains roles for persons with respect the edge deployment, the roles comprising blueprint users and blueprint authors, the blueprint users having first privileges, and the blueprint authors having second privileges.

3. The method of claim 1, further comprising in a second instance of the first determination where the blueprint user is not privileged to make the request:
    denying the request of the blueprint user to use the blueprint to update operation of the edge device.

4. The method of claim 1, further comprising in a second instance of the second determination where the blueprint author of the blueprint is not privileged to author the blueprint:
    denying the request of the blueprint user to use the blueprint to update operation of the edge device.

5. The method of claim 1, wherein a blueprint comprises a set of actions that can be performed by an edge device of the edge deployment.

6. The method of claim 5, wherein performing an action comprises installation of new software or changing or more features of software on the edge device of the edge deployment.

7. The method of claim 2, wherein the first privileges comprise at least one right to implement a blueprint in an edge device of the edge deployment and the second privileges comprise at least the right to implement, create, and modify the blueprint in the edge device of the edge deployment.

8. The method of claim 1, wherein a work order comprises instructions for at least how to implement the blueprint on an edge device of the edge deployment.

9. The method of claim 8, wherein the work order is signed with a private key of the blueprint user who obtains a request to use the blueprint to update operation of the edge device of the edge deployment.

10. The method of claim 9, wherein the work order implements a request to use a blueprint that is signed with private keys of one or more authors who created and modified the blueprint.

11. A non-transitory machine-readable medium having instructions stored therein, which when executed by a processor, cause the processor to perform operations for securing a blueprint, the operations comprising:
    obtaining, from a blueprint user, a request for an edge device of an edge deployment to use a blueprint to update operation of the edge device;
    making a first determination regarding whether the blueprint user is privileged to make the request for the edge device to use the blueprint to update the operation of the edge device;
    in a first instance of the first determination where the blueprint user is privileged to make the request:
        making a second determination regarding whether a blueprint author of the blueprint is privileged to author the blueprint;
        in a first instance of the second determination where the blueprint author of the blueprint privileged to author blueprint:
            creating a signed work order to implement the blueprint by the edge device; and providing the signed work order to the edge device to initiate use of the blueprint by the edge device.

12. The non-transitory machine-readable medium of claim 11, wherein the first determination is made at least in part using an identity and access management system that maintains roles for persons with respect the edge deployment, the roles comprising blueprint users and blueprint authors, the blueprint users having first privileges, and the blueprint authors having second privileges.

13. The non-transitory machine-readable medium of claim 11, wherein the operations further comprise, in a second instance of the first determination where the blueprint user is not privileged to make the request:
   denying the request of the blueprint user to use the blueprint to update operation of the edge device.

14. The non-transitory machine-readable medium of claim 11, wherein the operations further comprise, in a second instance of the second determination where the blueprint author of the blueprint is not privileged to author the blueprint:
   denying the request of the blueprint user to use the blueprint to update operation of the edge device.

15. The non-transitory machine-readable medium of claim 11, wherein a blueprint comprises a set of actions that can be performed by an edge device of the edge deployment.

16. A data processing system, comprising:
   a processor; and
   a memory coupled to the processor to store instructions, which when executed by the processor, cause the processor to perform operations for securing a blueprint, the operations comprising:
      obtaining, from a blueprint user, a request for an edge device of an edge deployment to use a blueprint to update operation of the edge device;
      making a first determination regarding whether the blueprint user is privileged to make the request for the edge device to use the blueprint to update the operation of the edge device;
      in a first instance of the first determination where the blueprint user is privileged to make the request:
         making a second determination regarding whether a blueprint author of the blueprint is privileged to author the blueprint;
         in a first instance of the second determination where the blueprint author of the blueprint privileged to author blueprint:
            creating a signed work order to implement the blueprint by the edge device; and
            providing the signed work order to the edge device to initiate use of the blueprint by the edge device.

17. The data processing system of claim 16, wherein the first determination is made at least in part using an identity and access management system that maintains roles for persons with respect the edge deployment, the roles comprising blueprint users and blueprint authors, the blueprint users having first privileges, and the blueprint authors having second privileges.

18. The data processing system of claim 16, wherein the operations further comprise, in a second instance of the first determination where the blueprint user is not privileged to make the request:
   denying the request of the blueprint user to use the blueprint to update operation of the edge device.

19. The data processing system of claim 16, wherein the operations further comprise, in a second instance of the second determination where the blueprint author of the blueprint is not privileged to author the blueprint:
   denying the request of the blueprint user to use the blueprint to update operation of the edge device.

20. The data processing system of claim 16, wherein a blueprint comprises a set of actions that can be performed by an edge device of the edge deployment.

\* \* \* \* \*